United States Patent
Alla et al.

(10) Patent No.: US 11,087,431 B2
(45) Date of Patent: Aug. 10, 2021

(54) METHODS AND APPARATUS FOR REDUCING DRAW COMMAND INFORMATION

(71) Applicant: QUALCOMM Incorporated, San Diego, CA (US)

(72) Inventors: Srihari Babu Alla, San Diego, CA (US); Jonnala Gadda Nagendra Kumar, San Diego, CA (US); Avinash Seetharamaiah, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/694,956

(22) Filed: Nov. 25, 2019

(65) Prior Publication Data
US 2021/0158470 A1    May 27, 2021

(51) Int. Cl.
*G06T 15/00* (2011.01)
*G06T 1/20* (2006.01)
*G06F 11/30* (2006.01)

(52) U.S. Cl.
CPC ............ *G06T 1/20* (2013.01); *G06F 11/3055* (2013.01); *G06T 15/005* (2013.01)

(58) Field of Classification Search
CPC ................................ G06T 1/20; G06T 15/005
USPC ........................................................ 345/501
See application file for complete search history.

(56) References Cited

U.S. PATENT DOCUMENTS

| 9,881,352 B2 | 1/2018 | Apodaca et al. | |
|---|---|---|---|
| 2008/0034311 A1* | 2/2008 | Aguaviva | G06F 11/3664 715/771 |
| 2014/0292771 A1* | 10/2014 | Kubisch | G06T 1/20 345/501 |
| 2015/0138197 A1* | 5/2015 | Yu | G06T 1/20 345/420 |
| 2016/0364901 A1 | 12/2016 | Balci et al. | |

(Continued)

OTHER PUBLICATIONS

Anonymous: "Delta Encoding—Wikipedia, the free Encyclopedia", May 22, 2011 (May 22, 2011), 4 Pages, XP055243166, Internet Article, Retrieved from the Internet: URL: https://en.wikipedia.org/w/index.php?title=Delta_encoding&oldid=430332569 [retrieved on Jan. 20, 2016] the whole document.

(Continued)

*Primary Examiner* — Thomas J Lett
(74) *Attorney, Agent, or Firm* — Campbell C. Chiang; Procopio, Cory, Hargreaves & Savitch LLP

(57) ABSTRACT

The present disclosure relates to methods and apparatus for graphics processing. Aspects of the present disclosure can determine a state for each graphics state group of a plurality of graphics state groups. Further, aspects of the present disclosure can determine whether at least one graphics state group of the plurality of graphics state groups includes a changed state. Additionally, aspects of the present disclosure can communicate state information for the at least one graphics state group when the at least one graphics state group includes a changed state. In some aspects, the state information includes information regarding the state of the at least one graphics state group. Aspects of the present disclosure can also configure a draw state for the plurality of graphics state groups, where the draw state includes state information for each of the graphics state groups.

49 Claims, 7 Drawing Sheets

(56) References Cited

U.S. PATENT DOCUMENTS

2018/0040095 A1    2/2018  Seetharamaiah et al.
2018/0165786 A1*   6/2018  Bourd .................. G06T 15/005

OTHER PUBLICATIONS

He Y., et al., "Shader Components: Modular and High Performance Shader Development", ACM Transactions on Graphics, ACM, NY, US, vol. 36, No. 4, Jul. 20, 2017 (Jul. 20, 2017), pp. 1-11, XP058372874, ISSN: 0730-0301, DOI: 10.1145/3072959.3073648, section 2.1.
International Search Report and Written Opinion—PCT/US2020/057378—ISA/EPO—dated Feb. 18, 2021.
Jukic T., "Draw Calls in a Nutshell", Jun. 26, 2015 (Jun. 26, 2015), 6 Pages, XP055767780, Retrieved from the Internet: URL: https://medium.com/@toncijukic/draw-calls-in-a-nutshell-597330a85381 [retrieved on Jan. 22, 2021] the whole document.

* cited by examiner

METHODS AND APPARATUS FOR REDUCING DRAW COMMAND INFORMATION

TECHNICAL FIELD

The present disclosure relates generally to processing systems and, more particularly, to one or more techniques for graphics processing.

INTRODUCTION

Computing devices often utilize a graphics processing unit (GPU) to accelerate the rendering of graphical data for display. Such computing devices may include, for example, computer workstations, mobile phones such as so-called smartphones, embedded systems, personal computers, tablet computers, and video game consoles. GPUs execute a graphics processing pipeline that includes one or more processing stages that operate together to execute graphics processing commands and output a frame. A central processing unit (CPU) may control the operation of the GPU by issuing one or more graphics processing commands to the GPU. Modern day CPUs are typically capable of concurrently executing multiple applications, each of which may need to utilize the GPU during execution. A device that provides content for visual presentation on a display generally includes a GPU.

Typically, a GPU of a device is configured to perform the processes in a graphics processing pipeline. However, with the advent of wireless communication and smaller, handheld devices, there has developed an increased need for improved graphics processing.

SUMMARY

The following presents a simplified summary of one or more aspects in order to provide a basic understanding of such aspects. This summary is not an extensive overview of all contemplated aspects, and is intended to neither identify key elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a central processing unit (CPU), a graphics processing unit (GPU), or any apparatus that can perform graphics processing. The apparatus can determine a state for each graphics state group of a plurality of graphics state groups. The apparatus can also determine whether at least one graphics state group of the plurality of graphics state groups includes a changed state. Additionally, the apparatus can communicate state information for the at least one graphics state group when the at least one graphics state group includes a changed state. In some aspects, the state information includes information regarding the state of the at least one graphics state group. The apparatus can also identify the at least one graphics state group of the plurality of graphics state groups including the changed state. Moreover, the apparatus can change the state for the at least one graphics state group of the plurality of graphics state groups such that the at least one graphics state group includes a changed state. The apparatus can also determine the state information for the at least one graphics state group of the plurality of graphics state groups. The apparatus can also transmit the state information for the at least one graphics state group of the plurality of graphics state groups to a GPU. Additionally, the apparatus can determine whether one or more graphics state groups of the plurality of graphics state groups include an unchanged state. The apparatus can also copy the state or state pointer for each of the one or more graphics state groups of the plurality of graphics state groups when the one or more graphics state groups include an unchanged state. The apparatus can also configure a draw state for the plurality of graphics state groups. Also, the apparatus can render at least some content of display content based on the state information for the at least one graphics state group of the plurality of graphics state groups. The apparatus can also determine each of the plurality of graphics state groups based on the display content.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
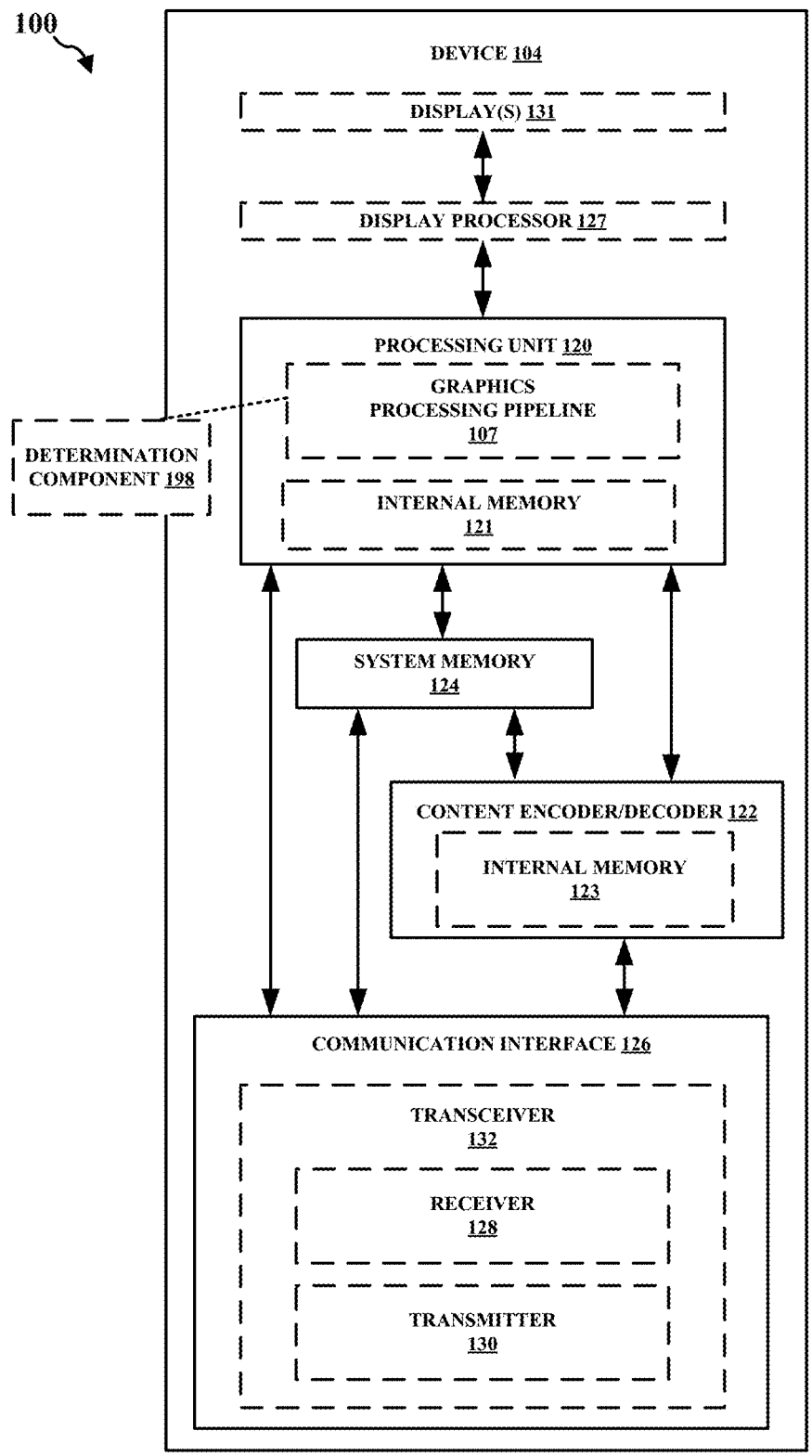
FIG. 1 is a block diagram that illustrates an example content generation system in accordance with one or more techniques of this disclosure.

Some CPUs build or write a full set of state information for each graphics state group, regardless of whether or not the state or context state for a particular graphics state group has changed. Building a full set of state information for every draw call can result in a lot of overhead from the CPU. The CPU can also inform the GPU to process a state for each of the separate graphics state groups, which can utilize too much workload at the CPU and/or GPU. Also, if the GPU is instructed to render each of the graphics state groups regardless of whether the graphics state groups change states, then the GPU can perform unnecessary work. Aspects of the present disclosure can reduce the CPU workload overhead when communicating graphics state information for each workload between draw calls. For instance, aspects of the present disclosure may communicate the incremental or changing states of graphics state groups for each draw call, and eliminate communicating the non-incremental or non-changing states of graphics state groups. By reducing the amount of unnecessary instruction from the CPU, and unnecessary state processing at the GPU, aspects of the present disclosure can reduce a substantial amount of workload at the CPU and/or GPU.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In general, this disclosure describes techniques for having a graphics processing pipeline in a single device or multiple devices, or a single device having multiple pipelines, improving the rendering of graphical content, and/or reducing the load of a processing unit, i.e., any processing unit configured to perform one or more techniques described herein, such as a GPU. For example, this disclosure describes techniques for graphics processing in any device that utilizes graphics processing. Other example benefits are described throughout this disclosure.

As used herein, instances of the term "content" may refer to "graphical content," "image," and vice versa. This is true regardless of whether the terms are being used as an adjective, noun, or other parts of speech. In some examples, as used herein, the term "graphical content" may refer to a content produced by one or more processes of a graphics processing pipeline. In some examples, as used herein, the term "graphical content" may refer to a content produced by a processing unit configured to perform graphics processing. In some examples, as used herein, the term "graphical content" may refer to a content produced by a graphics processing unit.

In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of an SOC. The device 104 may include one or more components configured to perform one or more techniques of this disclosure. In the example shown, the device 104 may include a processing unit 120, a content encoder/decoder 122, and a system memory 124. In some aspects, the device 104 can include a number of optional components, e.g., a communication interface 126, a transceiver 132, a receiver 128, a transmitter 130, a display processor 127, and one or more displays 131. Reference to the display 131 may refer to the one or more displays 131. For example, the display 131 may include a single display or multiple displays. The display 131 may include a first display and a second display. The first display may be a left-eye display and the second display may be a right-eye display. In some examples, the first and second display may receive different frames for presentment thereon. In other examples, the first and second display may receive the same frames for presentment thereon. In further examples, the results of the graphics processing may not be displayed on the device, e.g., the first and second display may not receive any frames for presentment thereon. Instead, the frames or graphics processing results may be transferred to another device. In some aspects, this can be referred to as split-rendering.

The processing unit 120 may include an internal memory 121. The processing unit 120 may be configured to perform graphics processing, such as in a graphics processing pipeline 107. The content encoder/decoder 122 may include an internal memory 123. In some examples, the device 104 may include a display processor, such as the display processor 127, to perform one or more display processing techniques on one or more frames generated by the processing unit 120 before presentment by the one or more displays 131. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 and the content encoder/decoder 122 may be communicatively coupled to the system memory 124 over a bus. In some examples, the processing unit 120 and the content encoder/decoder 122 may be communicatively coupled to each other over the bus or a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, SRAM, DRAM, erasable programmable ROM (EPROM), electrically erasable programmable ROM (EEPROM), flash memory, a magnetic data media or an optical storage media, or any other type of memory.

The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a central processing unit (CPU), a graphics processing unit (GPU), a general purpose GPU (GPGPU), or any other processing unit that may be configured to perform graphics processing. In some examples, the processing unit 120 may be integrated into a motherboard of the device 104. In some examples, the processing unit 120 may be present on a graphics card that is installed in a port in a motherboard of the device 104, or may be otherwise incorporated within a peripheral device configured to interoperate with the device 104. The processing unit 120 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 can include an optional communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the graphics processing pipeline 107 may include a determination component 198 configured to determine a state for each graphics state group of a plurality of graphics state groups. The determination component 198 can also be configured to determine whether at least one graphics state group of the plurality of graphics state groups includes a changed state. The determination component 198 can also be configured to communicate state information for the at least one graphics state group when the at least one graphics state group includes a changed state. In some aspects, the state information includes information regarding the state of the at least one graphics state group. The determination component 198 can also be configured to identify the at least one graphics state group of the plurality of graphics state groups including the changed state. The determination component 198 can also be configured to change the state for the at least one graphics state group of the plurality of graphics state groups such that the at least one graphics state group includes a changed state. The determination component 198 can also be configured to determine the state information for the at least one graphics state group of the plurality of graphics state groups. The determination component 198 can also be configured to transmit the state information for the at least one graphics state group of the plurality of graphics state groups to a GPU. The determination component 198 can also be configured to determine whether one or more graphics state groups of the plurality of graphics state groups include an unchanged state. The determination component 198 can also be configured to copy the state or state pointer for each of the one or more graphics state groups of the plurality of graphics state groups when the one or more graphics state groups include an unchanged state. The determination component 198 can also be configured to configure a draw state for the plurality of graphics state groups. The determination component 198 can also be configured to render at least some content of display content based on the state information for the at least one graphics state group of the plurality of graphics state groups. The determination component 198 can also be configured to determine each of the plurality of graphics state groups based on the display content.

As described herein, a device, such as the device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular component (e.g., a GPU), but, in further embodiments, can be performed using other components (e.g., a CPU), consistent with disclosed embodiments.

GPUs can process multiple types of data or data packets in a GPU pipeline. For instance, in some aspects, a GPU can process two types of data or data packets, e.g., context register packets and draw call data. A context register packet can be a set of global state information, e.g., information regarding a global register, shading program, or constant data, which can regulate how a graphics context will be processed. For example, context register packets can include information regarding a color format. In some aspects of context register packets, there can be a bit that indicates which workload belongs to a context register. Also, there can be multiple functions or programming running at the same time and/or in parallel. For example, functions or programming can describe a certain operation, e.g., the color mode or color format. Accordingly, a context register can define multiple states of a GPU.

Context states can be utilized to determine how an individual processing unit functions, e.g., a vertex fetcher (VFD), a vertex shader (VS), a shader processor, or a geometry processor, and/or in what mode the processing unit functions. In order to do so, GPUs can use context registers and programming data. In some aspects, a GPU can generate a workload, e.g., a vertex or pixel workload, in the pipeline based on the context register definition of a mode or state. Certain processing units, e.g., a VFD, can use these states to determine certain functions, e.g., how a vertex is assembled. As these modes or states can change, GPUs may need to change the corresponding context. Additionally, the workload that corresponds to the mode or state may follow the changing mode or state.

Figure 2:
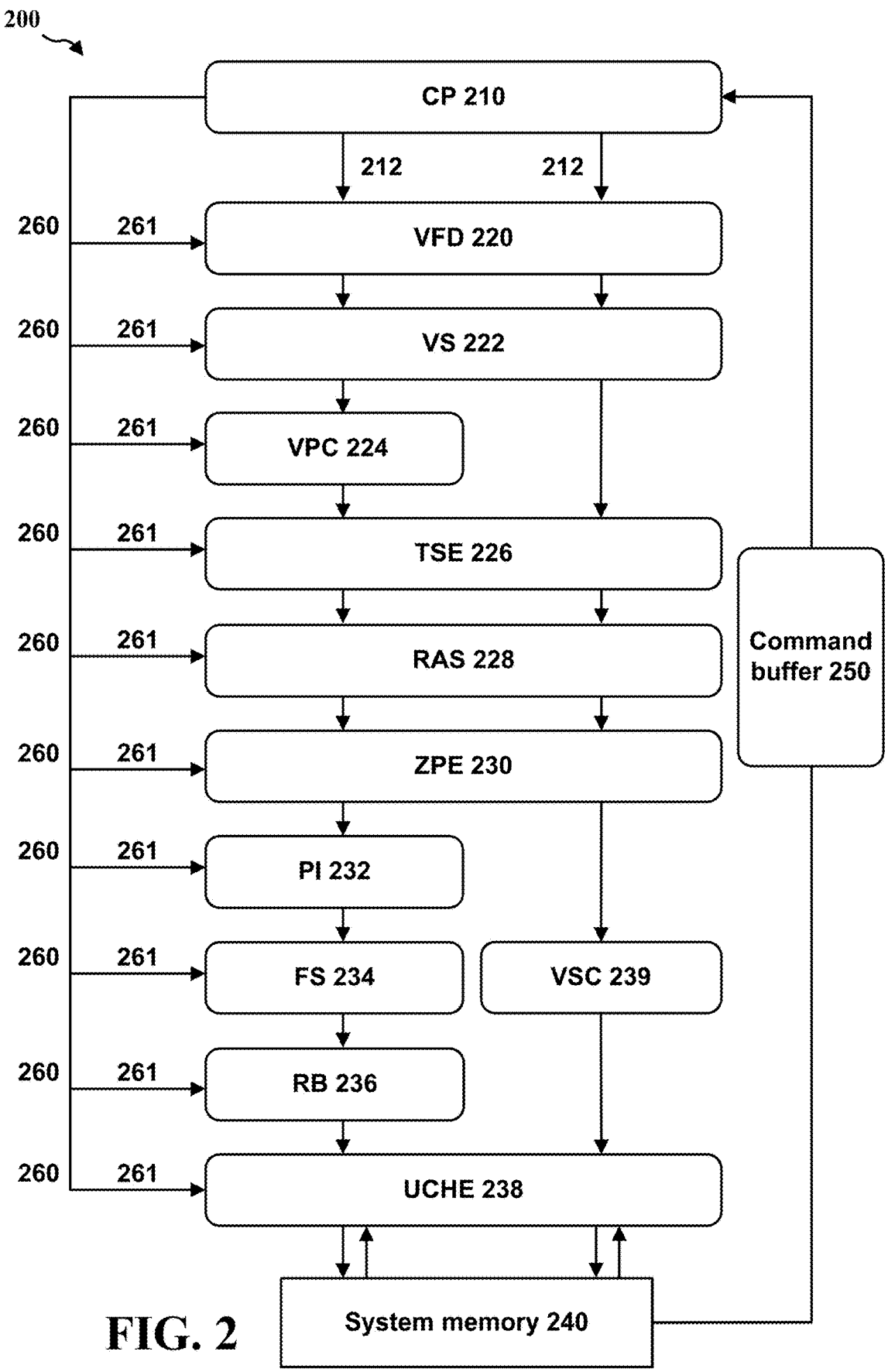
FIG. 2 illustrates an example GPU in accordance with one or more techniques of this disclosure.

FIG. 2 illustrates an example GPU 200 in accordance with one or more techniques of this disclosure. As shown in FIG. 2, GPU 200 includes command processor (CP) 210, draw call packets 212, VFD 220, VS 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, L2 cache (UCHE) 238, virtually split cache (VSC) 239, and system memory 240. Although FIG. 2 displays that GPU 200 includes processing units 220-238, GPU 200 can include a number of additional processing units. Additionally, processing units 220-238 are merely an example and any combination or order of processing units can be used by GPUs according to the present disclosure. GPU 200 also includes command buffer 250, context register packets 260, and context states 261.

As shown in FIG. 2, a GPU can utilize a CP, e.g., CP 210, or hardware accelerator to parse a command buffer into context register packets, e.g., context register packets 260, and/or draw call data packets, e.g., draw call packets 212. The CP 210 can then send the context register packets 260 or draw call data packets 212 through separate paths to the processing units or blocks in the GPU. Further, the command buffer 250 can alternate different states of context registers and draw calls. For example, a command buffer can be structured in the following manner: context register of context N, draw call(s) of context N, context register of context N+1, and draw call(s) of context N+1.

GPUs can render images in a variety of different ways. In some instances, GPUs can render an image using rendering or tiled rendering. In tiled rendering GPUs, an image can be divided or separated into different sections or tiles. After the division of the image, each section or tile can be rendered separately. Tiled rendering GPUs can divide computer graphics images into a grid format, such that each portion of the grid, i.e., a tile, is separately rendered. In some aspects, during a binning pass, an image can be divided into different bins or tiles. Moreover, in the binning pass, different primitives can be shaded in certain bins, e.g., using draw calls. In some aspects, during the binning pass, a visibility stream can be constructed where visible primitives or draw calls can be identified.

In some aspects, GPUs can apply the drawing or rendering process to different bins or tiles. For instance, a GPU can render to one bin, and then perform all the draws for the primitives or pixels in the bin. Additionally, a GPU can render to another bin, and perform the draws for the primitives or pixels in that bin. Therefore, in some aspects, there might be a small number of bins, e.g., four bins, that cover all of the draws in one surface. Further, GPUs can cycle through all of the draws in one bin, but perform the draws for the draw calls that are visible, i.e., draw calls that include visible geometry. In some aspects, a visibility stream can be generated, e.g., in a binning pass, to determine the visibility information of each primitive in an image or scene. For instance, this visibility stream can identify whether a certain primitive is visible or not. In some aspects, this information can be used to remove primitives that are not visible, e.g., in the rendering pass. Also, at least some of the primitives that are identified as visible can be rendered in the rendering pass.

In some aspects of tiled rendering, there can be multiple processing phases or passes. For instance, the rendering can be performed in two passes, e.g., a visibility or bin-visibility pass and a rendering or bin-rendering pass. During a visibility pass, a GPU can input a rendering workload, record the positions of the primitives or triangles, and then determine which primitives or triangles fall into which bin or area. In some aspects of a visibility pass, GPUs can also identify or mark the visibility of each primitive or triangle in a visibility stream. During a rendering pass, a GPU can input the visibility stream and process one bin or area at a time. In some aspects, the visibility stream can be analyzed to determine which primitives, or vertices of primitives, are visible or not visible. As such, the primitives, or vertices of primitives, that are visible may be processed. By doing so, GPUs can reduce the unnecessary workload of processing or rendering primitives or triangles that are not visible.

In some aspects, during a visibility pass, certain types of primitive geometry, e.g., position-only geometry, may be processed. Additionally, depending on the position or location of the primitives or triangles, the primitives may be sorted into different bins or areas. In some instances, sorting primitives or triangles into different bins may be performed by determining visibility information for these primitives or triangles. For example, GPUs may determine or write visibility information of each primitives in each bin or area, e.g., in a system memory. This visibility information can be used to determine or generate a visibility stream. In a rendering pass, the primitives in each bin can be rendered separately. In these instances, the visibility stream can be fetched from memory used to drop primitives which are not visible for that bin.

Some aspects of GPUs or GPU architectures can provide a number of different options for rendering, e.g., software rendering and hardware rendering. In software rendering, a driver or CPU can replicate an entire frame geometry by processing each view one time. Additionally, some different states may be changed depending on the view. As such, in software rendering, the software can replicate the entire workload by changing some states that may be utilized to render for each viewpoint in an image. In certain aspects, as GPUs may be submitting the same workload multiple times for each viewpoint in an image, there may be an increased amount of overhead. In hardware rendering, the hardware or GPU may be responsible for replicating or processing the geometry for each viewpoint in an image. Accordingly, the hardware can manage the replication or processing of the primitives or triangles for each viewpoint in an image.

Figure 3:
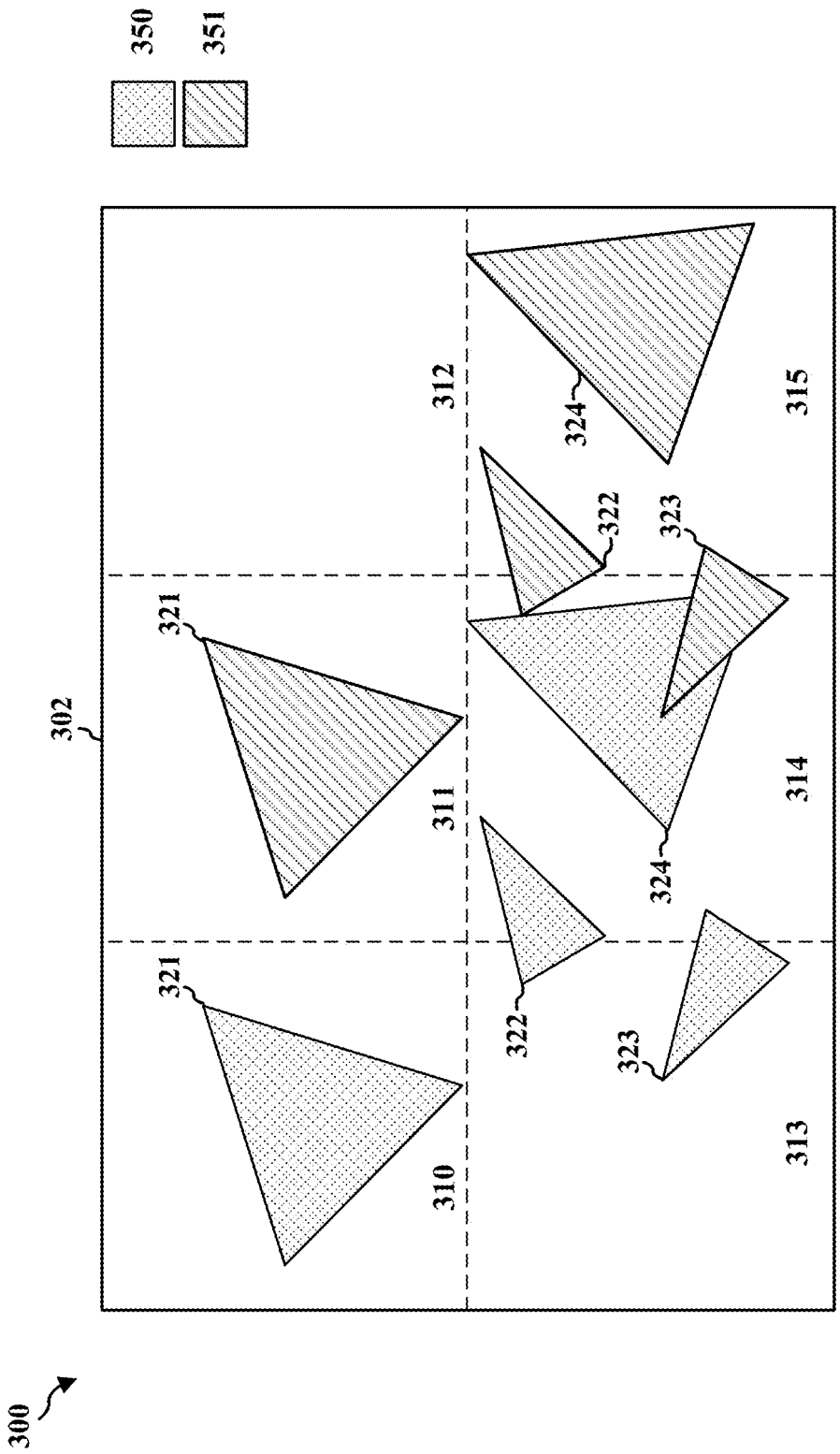
FIG. 3 illustrates an example image or surface in accordance with one or more techniques of this disclosure.

FIG. 3 illustrates image or surface 300, including multiple primitives divided into multiple bins. As shown in FIG. 3, image or surface 300 includes area 302, which includes primitives 321, 322, 323, and 324. The primitives 321, 322, 323, and 324 are divided or placed into different bins, e.g., bins 310, 311, 312, 313, 314, and 315. FIG. 3 illustrates an example of tiled rendering using multiple viewpoints for the primitives 321-324. For instance, primitives 321-324 are in first viewpoint 350 and second viewpoint 351. As such, the GPU processing or rendering the image or surface 300 including area 302 can utilize multiple viewpoints or multi-view rendering.

As indicated herein, GPUs or graphics processor units can use a tiled rendering architecture to reduce power consumption or save memory bandwidth. As further stated above, this rendering method can divide the scene into multiple bins, as well as include a visibility pass that identifies the triangles that are visible in each bin. Thus, in tiled rendering, a full screen can be divided into multiple bins or tiles. The scene can then be rendered multiple times, e.g., once for each bin.

As indicated above, GPUs can cycle through each draw call in one bin and perform the draw calls that are visible. In some aspects, draw calls that fall into a given bin are considered live draw calls, while draw calls that fall outside the bin are considered dead draw calls. Efficiently skipping dead draw calls can lower the hardware overhead caused by rendering a scene multiple times.

For each function of the GPU, there can be an assigned group, i.e., a workload group or graphics state group. The workload or graphics state groups can also include a corresponding state or context state. So each of the workload or graphics state groups that correspond to a specific state or context state can perform a function of the GPU. For example, a depth state can be one workload or graphics state group, a blend state can be another workload or graphics state group, and a fragment shader state can be another workload or graphics state group.

For each bin or tile, the GPU can execute all the workload or graphics state groups and fetch each live draw for that particular bin. Also, a command stream can be fetched by the GPU for each bin rendering. Additionally, as indicated above, in the visibility pass, the GPU can process the command stream. The GPU can also determine which draw call is visible in a particular bin during the visibility pass.

During the visibility pass, the GPU can also build a set of state information or context state information for each graphics state group in each draw call. In some aspects, the GPU can also build the full set of state information for each draw call when the CPU or software provides incremental or changing states or context states. Accordingly, the CPU can communicate these incremental states or context states for the workload or graphics state groups during the visibility pass. In some aspects, the command stream can be sent before each draw call is performed, e.g., in the visibility pass. As such, the command stream can be transmitted in the visibility pass before the GPU renders or draws.

In some instances, the CPU or software can build or write a full state or context state for each graphics state group between draw calls. By doing so, the CPU can help the GPU or hardware skip to the next draw call, instead of fetching the command stream for dead draw calls. Thus, in some aspects, the CPU can build or write a full set of state information for each graphics state group whether or not the state or context state for a particular graphics state group has changed. For example, if draw calls 1-3 are dead draw calls, in order to jump from draw call 0 to draw call 4, the CPU or software may build the full set of state information for each graphics state group between the draw calls.

In order to build the full set of state information for each graphics state group, the CPU may utilize the graphics state of each graphics state group, e.g., context registers, constants, shaders, and resource descriptors. Indeed, in some aspects, each draw call may contain a complete set of context state information, which can add considerable driver overhead.

As stated above, the workload or graphics state groups can include constants, vertex shaders, fragment shaders, geometry shaders, context registers, fetchers, resource descriptors, blend states, data states, depth states, etc. The amount of workload or graphics state groups can be any appropriate number, e.g., 8, 16, 32, or 64. Further, each workload or graphics state group can correspond to a particular state or context state, e.g., performed at the GPU. In some aspects, the CPU can instruct the GPU on how to divide its workload into different workload or graphics state groups. The GPU can then process these different workload or graphics state groups. In some aspects, the GPU may not have knowledge regarding which group corresponds to a particular state or context state.

In some aspects, the CPU or driver can include an amount of workload overhead, e.g., 1% to 20% workload overhead, in order to build a full set of state information for each draw call. Building a full state is required for the CP to effectively skip dead draw calls and move to the next live draw of that bin during a bin render pass. This overhead can depend on the type of workload, as well as whether the CPU builds the previous state information for each graphics state group with unchanged states. In some instances, the software may build a command stream with the new state information for the changing groups, i.e., incremental state information. Accordingly, an incremental state can be a state that is changing from a previous draw call. Likewise, a non-incremental state can be a state that does not change from a previous draw call. By sending the incremental states without the non-incremental states, the CPU may reduce workload overhead. Also, the CPU may build command streams with incremental states to avoid driver overhead.

Figure 4:
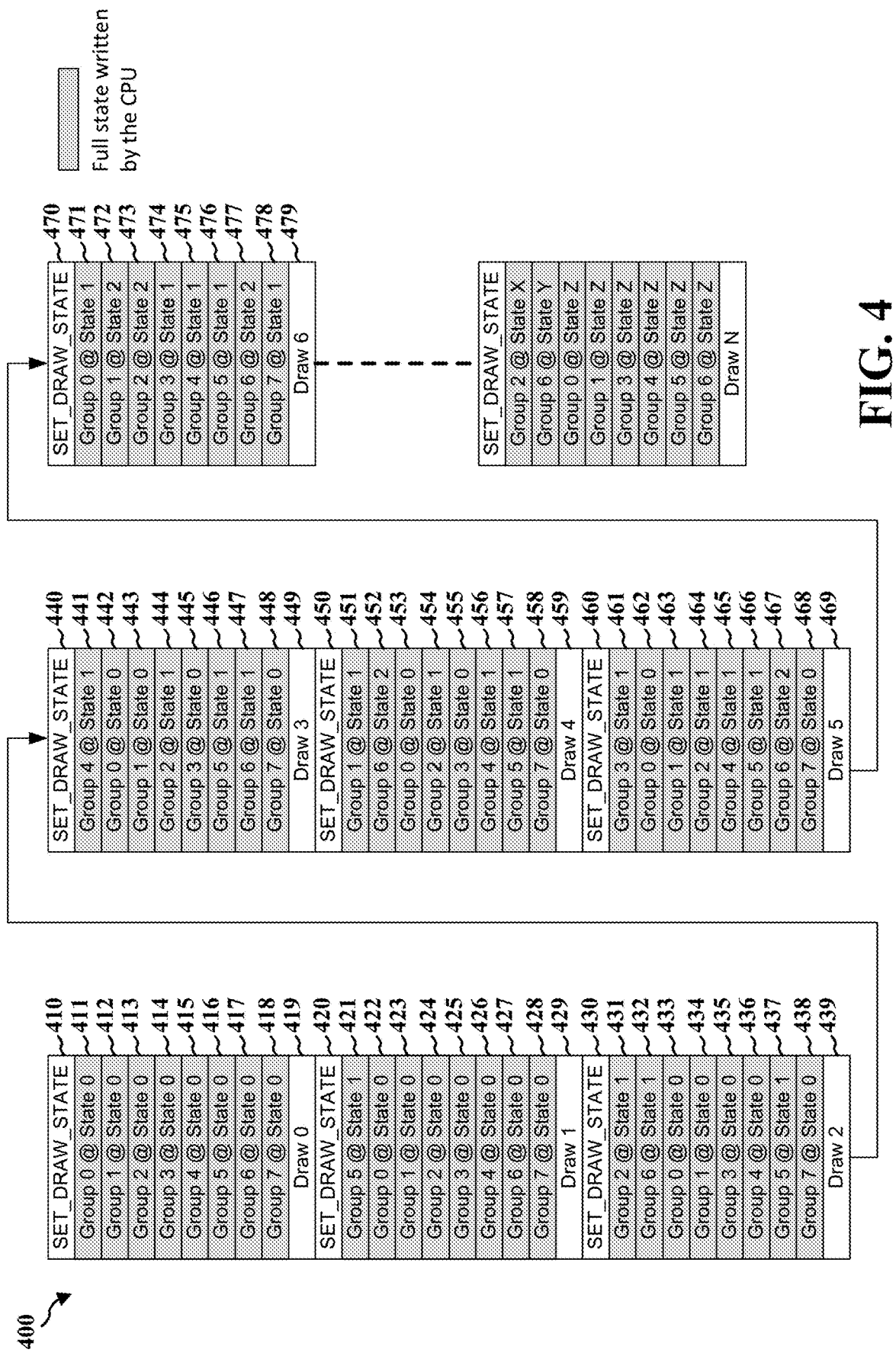
FIG. 4 illustrates an example diagram including state information in accordance with one or more techniques of this disclosure.

FIG. 4 illustrates an example diagram 400 including state information. FIG. 4 displays graphics state groups 0-7 including a corresponding state for a particular draw call. Also, FIG. 4 shows that the full state information is built or written by the CPU for each state in every draw call. Accordingly, even if a context state for a graphics state group is not changing from one draw call to the next, the CPU can continue to build that particular state.

FIG. 4 also shows which graphics state groups correspond to a particular context state for each draw call. For example, for draw call 0 performed at step 419, the CPU can set the draw state at 410, including the state information 411-418 for the corresponding groups 0-7. For draw call 1 performed at step 429, the CPU can set the draw state at 420, including the state information 421-428 for the corresponding groups 0-7. For draw call 2 performed at step 439, the CPU can set the draw state at 430, including the state information 431-438 for the corresponding groups 0-7. For draw call 3 performed at step 449, the CPU can set the draw state at 440, including the state information 441-448 for the corresponding groups 0-7. For draw call 4 performed at step 459, the CPU can set the draw state at 450, including the state information 451-458 for the corresponding groups 0-7. For draw call 5 performed at step 469, the CPU can set the draw state at 460, including the state information 461-468 for the corresponding groups 0-7. For draw call 6 performed at step 479, the CPU can set the draw state at 470, including the state information 471-478 for the corresponding groups 0-7.

As shown in FIG. 4, the graphics state groups 0-7 can include three different context states, e.g., states 0, 1, or 2, for different draw calls. The context states for some graphics state groups can change, e.g., move from state 0 to state 1, between subsequent draw calls. For example, the context state changes from 0 to 1 for group 5 from draw call 0 to draw call 1. As further shown in FIG. 4, this pattern can continue for the graphics state groups until a particular draw call, e.g., draw N, for different states, e.g., states X, Y, or Z. FIG. 4 also displays 8 different graphics state groups, but there can be any different number of appropriate graphics state groups, e.g., 8, 16, 32, or 64. As mentioned above, the workloads or states of the GPU are divided into these workload or graphics state groups.

As indicated above, FIG. 4 shows that the states for each graphics state group may be built, even if they are not changing. Building a full set of state information for every draw call can result in significant overhead from the CPU, which can also result in a lot of CPU workload cycles. This can also impact the CPU power consumption when the GPU workload is running. As shown in FIG. 4, from draw call 0 to draw call 1, group 5 can change from state 0 to state 1, but the CPU may still build or write each state for draw 1. Additionally, from draw call 1 to draw call 2, group 2 and group 6 may change from state 0 to state 1, but the CPU may still build or write each state for draw call 2. As such, the full state for all groups can be written by the CPU, regardless of whether the states change for each group.

In some aspects, when the full state for all groups is written by the CPU, the CPU can inform the GPU to process every one of those states for each group. Accordingly, the GPU may process more workload cycles because there is a full state for every draw call. Moreover, the CPU can send the full state information for each draw call to the GPU regardless of the GPU rendering mode.

In some aspects, a GPU can have different rendering modes, e.g., direct or software binning mode and/or hardware binning mode. As mentioned herein, in software binning mode, the GPU can render each tile and process all of the draw calls in each bin. Additionally, in software binning mode, there may be no information communicated regarding live or dead draw calls. For example, in software binning mode, an entire surface can be rendered simultaneously, rather than rendering by dividing the surface into small tiles or bins. As mentioned herein, software binning mode may not include a visibility pass. In some aspects, software binning mode can be useful when there are a fewer number of draw calls.

In hardware binning mode, there is a visibility pass where the GPU processes each draw call and/or generates the visibility information. As mentioned herein, the visibility information can describe which draw call is visible in each bin or tile. Further, in hardware binning mode, the surface is divided into tiles, and each tile is rendered separately by processing all of the draw calls for each tile. As stated above, this visibility information includes information regarding live or dead draw calls. In some aspects, during or after the visibility pass, the live or dead draw call information for each bin can be communicated to the GPU, and the GPU can render each bin based on the live or dead draw call information. Accordingly, before each bin is rendered, the GPU can copy the full set of state information for each draw call.

As indicated above, in some aspects, the CPU can inform the GPU to process a state for each of the separate graphics state groups, which can utilize a significant amount of workload at the CPU. Also, if the GPU is instructed to process each of the graphics state groups, regardless of whether the graphics state groups change states, then the GPU can perform unnecessary work. By eliminating the unnecessary instruction from the CPU, and the unnecessary state processing at the GPU, a substantial amount of workload can be saved at both the CPU and GPU.

Aspects of the present disclosure can eliminate the CPU workload overhead, e.g., proportional to CPU power utilized, based on communicating a full graphics state information for each workload between draw calls. For instance, aspects of the present disclosure may communicate the incremental or changing states of graphics state groups for each draw call, and eliminate communicating the non-incremental or non-changing states of graphics state groups. This can occur in both software binning mode and hardware binning mode.

In some aspects, in hardware binning mode, the command processor (CP) of the GPU can copy the non-incremental states from the previous draw call to the next draw call. The CP can also fetch the command stream for the visibility pass. Accordingly, the non-incremental states can be copied by the command stream of the CP during the visibility pass. In some instances, the overhead of the CP copying the non-incremental state can be hidden. For instance, the overhead of the CP can be hidden or moved when the GPU is processing the visibility pass ahead of the rendering pass for each bin, or in parallel to the previous rendering pass. Indeed, the GPU pipeline can process the visibility pass in parallel to the rendering pass of the previous frame, and by doing so, the entire visibility pass processing can be hidden.

As indicated herein, aspects of the present disclosure can enable the CPU or software to identify the incremental or changing states for each graphics state group from a previous draw call, rather than provide a full set of state information for every group for each draw call. As such, the CPU or software can send the changing states to the GPU. By doing so, this can save workload cycles at the CPU and/or reduce the CPU driver overhead. For instance, rather than building the complete set of state information for each graphics state group for each draw call, the CPU can build or write non-incremental or non-changing states, which saves on the amount of workload performed.

As indicated herein, in some aspects, e.g., in direct render mode or software binning mode, the CP of the GPU can directly process the incremental states of the graphics state groups, instead of building the full set of state information per draw call. This can reduce the amount of workload, such that the reduced workload can be processed faster compared to a complete state workload, e.g., processing the full set of state information including non-incremental states for every draw call. As the full set of state information will not be built, the GPU can perform other processing while processing the incremental states. As indicated above, in the hardware binning visibility pass, the CP may not process the full set of state information for every draw call. The CP can also build a set draw state mask that can be used in the bin rendering pass. Further, as the CP may not process the full state, the visibility pass processing at the GPU can be faster compared to building the full set of state information.

In some aspects, in different rendering modes, e.g., in direct mode, software binning mode or hardware binning mode, the CPU may send incremental state information to the GPU. In direct mode or software binning mode, the GPU may not build a full set of state information or copy the non-changing states, as there is no visibility pass. When the GPU is rendering the frame, the GPU can process the changed states directly. In some aspects, in direct mode or software binning mode, the GPU can process the rendering pass more quickly as it does not build the full set of state information or copy the non-changing states. For instance, during the rendering pass, the GPU may process the incremental states for graphics state groups, so the GPU can perform fewer workload cycles for each draw call.

In hardware binning mode, the GPU can build a full set of state information for each graphics state group in each draw call, e.g., during a visibility pass. As indicated above, hardware binning mode may include a visibility pass, and the copying of the non-incremental state information can also be performed during the visibility pass. The GPU will perform fewer workload cycles because it is copying the non-changing states, rather than processing all of the states including the non-changing states. Also, by copying each of the non-changing states, aspects of the present disclosure can more efficiently build a full set of state information for each graphics state group in each draw call, so that each tiled rendering pass can be processed faster.

As indicated above, aspects of the present disclosure can include a CPU building or writing incremental state change information for each graphics state group. In some aspects, e.g., during a hardware binning mode, the GPU can generate or copy the remaining state information for non-changing graphics state groups during the visibility pass. As mentioned herein, the visibility pass can occur prior to the rendering pass of each bin.

Figure 5:
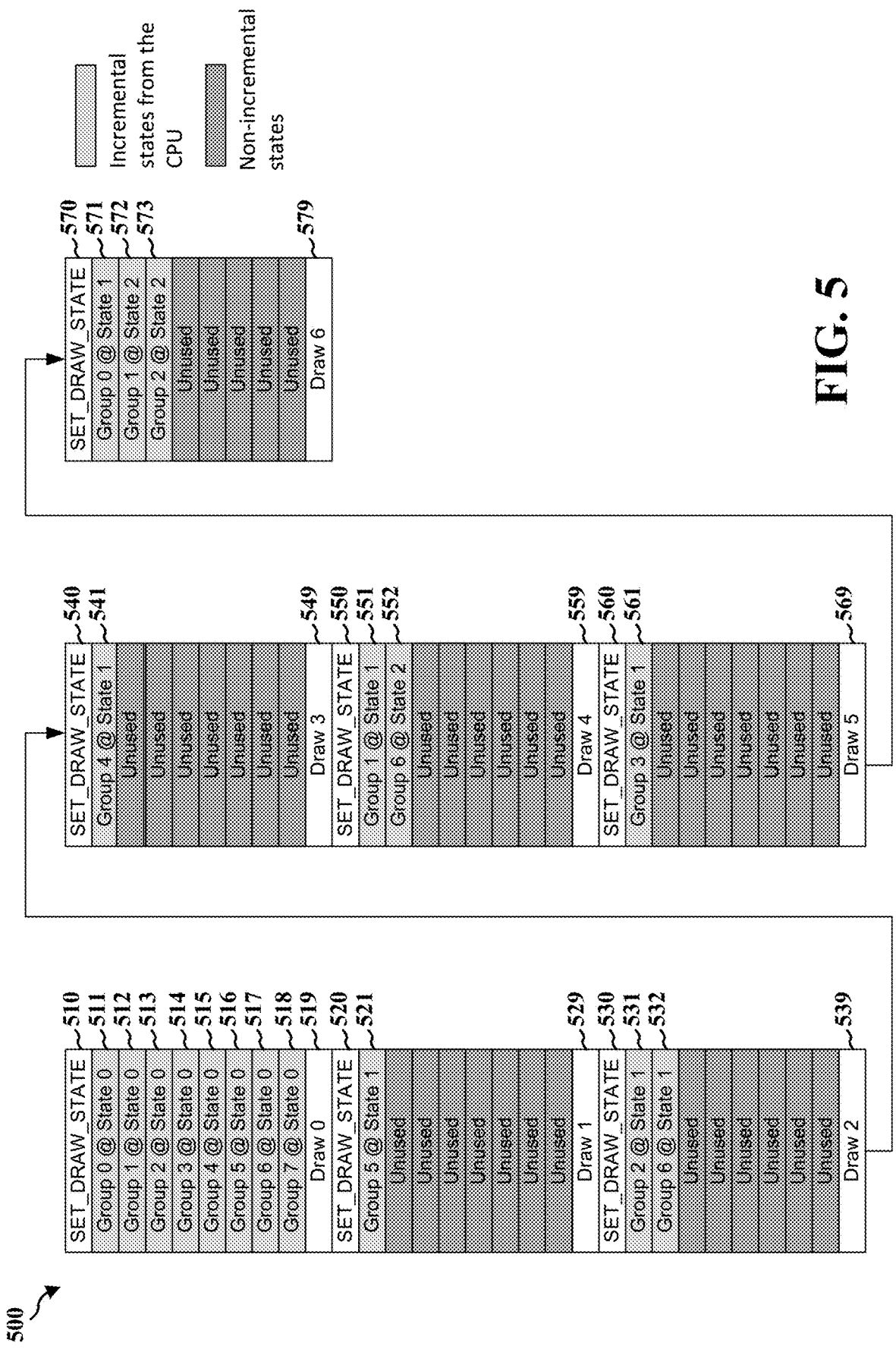
FIG. 5 illustrates an example diagram including state information in accordance with one or more techniques of this disclosure.

FIG. 5 illustrates an example diagram 500 including state information in accordance with one or more techniques of this disclosure. FIG. 5 displays workload or graphics state groups 0-7 including a corresponding context state for each draw call. Also, FIG. 5 shows that the context state information is built or written by the CPU for each incremental or changing state in each draw call. Accordingly, if a context state for a graphics state group is not changing from one draw call to the next, then it will not be built or written by the CPU. The non-incremental states that are not built or written are marked as "unused" in FIG. 5.

FIG. 5 also shows which graphics state groups correspond to incremental or changing states for each draw call. For example, for draw call 0 performed at step 519, the CPU can set the draw state at 510, including the incremental state information 511-518 for the corresponding groups 0-7. For draw call 1 performed at step 529, the CPU can set the draw state at 520, including the incremental state information 521 for the corresponding group 5. For draw call 2 performed at step 539, the CPU can set the draw state at 530, including the incremental state information 531 and 532 for the corresponding groups 2 and 6. For draw call 3 performed at step 549, the CPU can set the draw state at 540, including the incremental state information 541 for the corresponding group 4. For draw call 4 performed at step 559, the CPU can set the draw state at 550, including the incremental state information 551 and 552 for the corresponding groups 1 and 6. For draw call 5 performed at step 569, the CPU can set the draw state at 560, including the incremental state information 561 for the corresponding group 3. For draw call 6 performed at step 579, the CPU can set the draw state at 570, including the incremental state information 571, 572, and 573 for the corresponding groups 0, 1, and 2. As indicated above, the state information marked as "unused" can correspond to a non-incremental or unchanging state for a graphics state group.

As shown in FIG. 5, the graphics state groups 0-7 can include three different context states, e.g., states 0, 1, or 2, for different draw calls. The context states for some graphics state groups can change, e.g., move from state 0 to state 1, between subsequent draw calls. For example, the context state changes from 0 to 1 for group 5 from draw call 0 to draw call 1, e.g., as shown in step 521. As mentioned above, FIG. 5 also displays 8 different graphics state groups, but there can be any different number of appropriate graphics state groups, e.g., 8, 16, 32, or 64.

FIG. 5 displays an incremental stream including incremental state information, which is sent from the CPU to the GPU before the visibility pass is executed by the GPU. The set draw state in FIG. 5, e.g., "SET DRAW STATE" at steps 510, 520, 530, 540, 550, 560, and 570, instructs the GPU to set the draw state for each of the groups. As the groups with non-incremental states are not identified, the set draw state can instruct the GPU to set the draw state for groups including an incremental state or changing state. As shown in FIG. 5, the CPU or software reserves a space for the non-incremental states without building or writing any information. In the hardware binning mode, the CPU can send this information to the GPU prior to the visibility pass.

As indicated herein, in some aspects of the present disclosure, the CPU can send information to the GPU regarding the incremental or changed states for a workload or graphics state group. The CPU can send information for graphics state groups that actually change states, but not send information for graphics state groups that do not change states. As shown in FIG. 5, there is no information, i.e., "unused" information, for groups that do not change states for a new draw call. In some instances, "unused" can be the memory not used by the CPU. For example, this system memory can be unused by the CPU so that the GPU can copy non-incremental states based on the GPU render mode. By skipping over the non-changed states in each draw call, the CPU is saving processing time per draw call. After the CPU sends the changed state information for the groups, the GPU can generate the visibility information for each draw and also build the full set of state information for each draw call. In hardware binning mode, the GPU can copy the state information for non-incremental states in the visibility pass.

The GPU can determine which workload or context state groups have not changed states based on the state information from the GPU. The GPU or command processor (CP) can copy the groups that have not changed states, e.g., during the visibility pass in hardware binning mode. Additionally, during the visibility pass, the GPU can hide or move these cycles in a parallel pipeline. In some aspects of the present disclosure, the CPU or software can build a command stream with incremental states as shown in FIG. 5, rather than a full set of state information per draw call. By doing so, the CPU can reduce its processing workload, as well as reduce the processing workload at the GPU.

Figure 6:
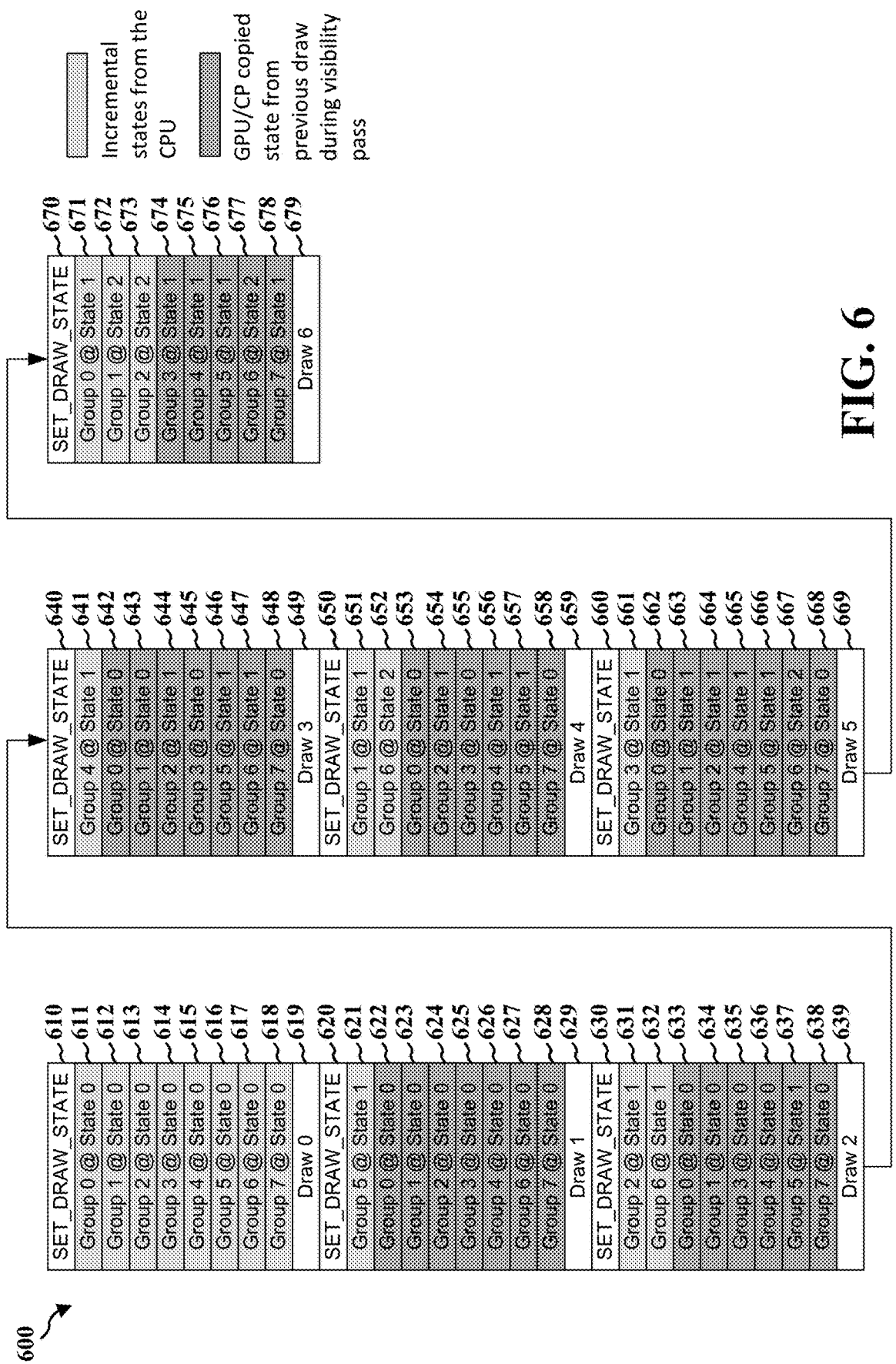
FIG. 6 illustrates an example diagram including state information in accordance with one or more techniques of this disclosure.

FIG. 6 illustrates an example diagram 600 including state information in accordance with one or more techniques of this disclosure. FIG. 6 displays workload or graphics state groups 0-7 including a corresponding context state for each draw call. FIG. 6 also shows that the context state information is built or written by the CPU for each incremental or changing state in each draw call, e.g., as shown in light gray in FIG. 6. If a context state for a graphics state group is not changing from one draw call to the next, then it will not be built or written by the CPU. The GPU or CP can then copy the non-incremental or unchanging states from a previous draw call, e.g., during a visibility pass, as shown in dark gray in FIG. 6.

FIG. 6 shows which graphics state groups include incremental or changing states for each draw call, and which graphics state groups include non-incremental states and are copied by the GPU. For example, for draw call 0 performed at step 619, the CPU can set the draw state at 610, including the incremental state information 611-618 for the corresponding groups 0-7. For draw call 1 performed at step 629, the CPU can set the draw state at 620, including the incremental state information 621 for the corresponding group 5. The GPU can copy the non-incremental state information 622-628 for corresponding groups 0-4 and 6-7. For draw call 2 performed at step 639, the CPU can set the draw state at 630, including the incremental state information 631 and 632 for the corresponding groups 2 and 6. The GPU can copy the non-incremental state information 633-638 for corresponding groups 0-1, 3-5, and 7. Although FIGS. 4-6 display eight groups, the number of groups is not limited to eight. For instance, there can be any appropriate number of groups. FIGS. 4-6 are simplified to display eight groups.

For draw call 3 performed at step 649, the CPU can set the draw state at 640, including the incremental state information 641 for the corresponding group 4. The GPU can copy the non-incremental state information 642-648 for corresponding groups 0-3 and 5-7. For draw call 4 performed at step 659, the CPU can set the draw state at 650, including the incremental state information 651 and 652 for the corresponding groups 1 and 6. The GPU can copy the non-incremental state information 653-658 for corresponding groups 0, 2-5, and 7. For draw call 5 performed at step 669, the CPU can set the draw state at 660, including the incremental state information 661 for the corresponding group 3. The GPU can copy the non-incremental state information 662-668 for corresponding groups 0-2 and 4-7. For draw call 6 performed at step 679, the CPU can set the draw state at 670, including the incremental state information 671, 672, and 673 for the corresponding groups 0, 1, and 2. The GPU can copy the non-incremental state information 674-678 for corresponding groups 3-7.

As shown in FIG. 6, the graphics state groups 0-7 can include three different context states, e.g., states 0, 1, or 2, for different draw calls. The context states for some graphics state groups can change, e.g., move from state 0 to state 1, between subsequent draw calls. For example, the context state changes from 0 to 1 for group 5 from draw call 0 to draw call 1, e.g., as shown in step 621. As mentioned above, FIG. 6 also displays 8 different graphics state groups, but there can be any different number of appropriate graphics state groups, e.g., 8, 16, 32, or 64.

FIG. 6 displays a command stream during the visibility pass, e.g., in hardware binning mode, that is executed by the GPU. The command stream includes incremental state information built and sent by a CPU and non-incremental state information copied by the GPU. As mentioned above, the CPU can reserve the non-incremental states for each group in the command stream, and then each non-incremental state can be copied by the GPU. So the CPU or software can perform the light gray steps in FIG. 6, and the GPU or hardware can copy the dark gray steps.

The diagram 600 in FIG. 6 shows the visible representation of the command stream, e.g., after GPU has finished processing the visibility pass. As shown in FIG. 6, the GPU will execute draw 0 at step 619 in the visibility pass. The GPU then fetches the state information for group 5 at step 621 and executes draw 1 at step 629 of the visibility pass. While it is executing the visibility pass, the GPU can copy or fill-in the unchanged states of groups 0-4 and 6-7 at steps 622-628. So after the CPU sends the incremental or changed state information for the changing groups, and during the visibility pass, the GPU can generate the visibility information for each draw call and also copy non-incremental state information to prepare the full state for each draw call. For example, the CPU can send the incremental or changed state information for draw 1, e.g., as group 5 changes from state 0 to state 1, and then the GPU generates the visibility information for group 5 and copies or fills-in the state information for the non-changing groups 0-4 and 6-7.

As indicated herein, the CP of the GPU can copy the non-incremental states for corresponding workloads from the previous draw call to the next draw call, e.g., during the visibility pass. Accordingly, in hardware binning mode, the GPU builds a full set of state information during the visibility pass. One advantage of doing so is that the work the GPU is performing, e.g., copying the non-incremental state information from the previous draw call, can be hidden or moved away from the normal GPU processing. This hidden or moved work can be performed in a parallel work pipeline.

FIGS. 5 and 6 illustrate examples of the aforementioned processes for communicating state information during an incremental stream or a command stream. As shown in FIGS. 5 and 6, aspects of the present disclosure, e.g., CPUs and GPUs herein, can perform a number of different steps or processes to communicate state information in an incremental stream or a command stream. For instance, CPUs herein can determine each of the plurality of graphics state groups, e.g., groups 0-7 in FIGS. 5 and 6, based on display content. CPUs herein can also configure or set a draw state, e.g., at steps 510, 520, 530, 540, 550, 560, 570 in FIG. 5, for the plurality of graphics state groups. In some aspects, the draw state can include state information for each of the plurality of graphics state groups, e.g., state information in 511-518 in FIG. 5. CPUs herein can also determine a state, e.g., the states in 511-518 in FIG. 5, for each graphics state group of a plurality of graphics state groups.

CPUs herein can also change the state for at least one graphics state group of the plurality of graphics state groups such that the at least one graphics state group includes a changed state, e.g., group 5 changes from state 0 to state 1 at 521 in FIG. 5. CPUs herein can also determine whether at least one graphics state group of the plurality of graphics state groups includes a changed state, e.g., the CPU can determine group 5 changes from state 0 to state 1 at 521 in FIG. 5. CPUs herein can also identify the at least one graphics state group of the plurality of graphics state groups including the changed state, e.g., the CPU can identify group 5 changes from state 0 to state 1 at 521 in FIG. 5.

CPUs herein can also determine the state information for the at least one graphics state group of the plurality of graphics state groups, e.g., the CPU can determine the state information at 611-618 in FIG. 6. CPUs herein can also communicate the state information for the at least one graphics state group of the plurality of graphics state groups when the at least one graphics state group includes a changed state, e.g., the CPU can communicate the state information for group 5 at 621 in FIG. 6. In some aspects, the state information can include information regarding the state of the at least one graphics state group, e.g., the state information for group 5 at 621 in FIG. 6. CPUs herein can also transmit the state information for the at least one graphics state group of the plurality of graphics state groups to a GPU, e.g., the CPU can transmit the state information for group 5 at 621 in FIG. 6. In some aspects, the state information for the at least one graphics state group can be transmitted by a CPU, e.g., as shown at 621 in FIG. 6.

CPUs and GPUs herein can also determine whether one or more graphics state groups of the plurality of graphics state groups include an unchanged state, e.g., the CPU or GPU can determine whether groups 0-4 and 6-7 include an unchanged state at 622-628 in FIG. 6. CPUs and GPUs herein can also copy the state or state pointer for each of the one or more graphics state groups of the plurality of graphics state groups when the one or more graphics state groups include an unchanged state, e.g., the CPU or GPU can copy the state or state pointer for groups 0-4 and 6-7 at 622-628 in FIG. 6. In some aspects, the state for each of the one or more graphics state groups including the unchanged state can be copied by a CP of a GPU during a visibility pass. In some aspects, the one or more graphics state groups of the plurality of graphics state groups including an unchanged state can be determined based on the state information, e.g., groups 0-4 and 6-7 at 622-628 in FIG. 6 can be determined based on state information.

CPUs and GPUs herein can also render at least some content of display content based on the state information for the at least one graphics state group of the plurality of graphics state groups, e.g., the GPU can render at least some content of display content based on the state information for group 5 at 621 in FIG. 6. In some aspects, the changed state of the at least one graphics state group can be determined based on a previous draw call and a current draw call, e.g., the changed state for group 5 at 621 can be determined based on draw call 0 at 619 and draw call 1 at 629. In some instances, the state information can include a list of the state for each graphics state group of the at least one graphics state group, e.g., FIG. 6 shows a list of state information at 611-618. In some aspects, the determination whether the at least one graphics state group of the plurality of graphics state groups includes a changed state can be performed by a CPU.

The aforementioned aspects of the present disclosure can include a number of advantages. For instance, aspects of the present disclosure can reduce the CPU overhead while reducing the GPU overhead when processing the command stream for each bin. Indeed, rather than the CPU building the complete state information for each draw call, the CPU may build the information for incremental or non-changing states. Additionally, in direct rendering mode or software binning mode, the GPU can directly process the incremental states instead of building the full state information per draw call, which can increase processing speeds. Moreover, in the visibility pass in hardware binning mode, the CP of the GPU may not process the full set of state information for every draw call, as the state information for non-incremental states can be copied. By doing so, the GPU can build a set draw state mask that can be used in the rendering pass.

Figure 7:
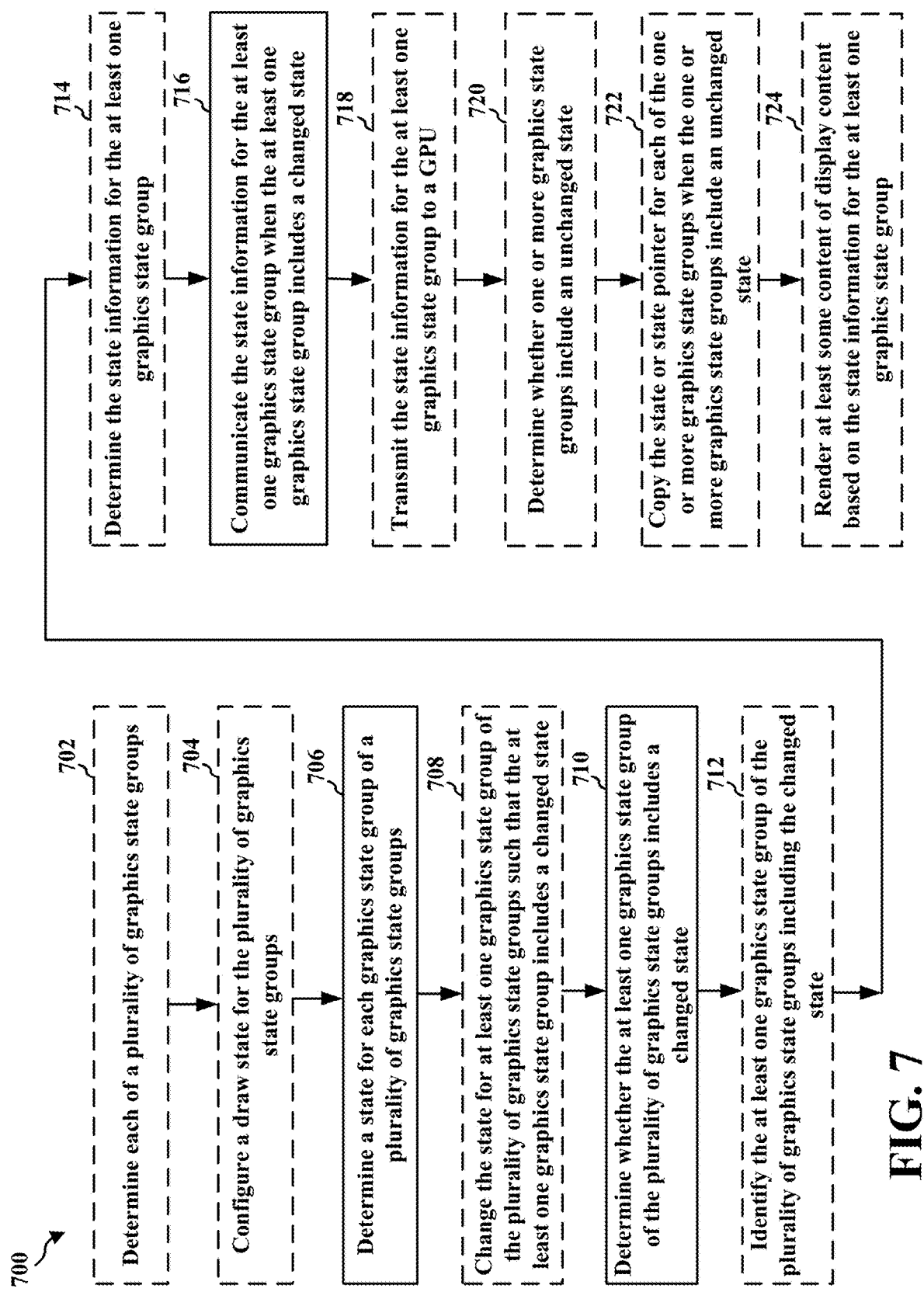
FIG. 7 illustrates an example flowchart of an example method in accordance with one or more techniques of this disclosure.

FIG. 7 illustrates an example flowchart 700 of an example method in accordance with one or more techniques of this disclosure. The method may be performed by an apparatus such as a CPU, a GPU, or an apparatus for graphics processing. At 702, the apparatus may determine each of the plurality of graphics state groups, e.g., based on display content, as described in connection with the examples in FIGS. 3, 4, 5, and 6. At 704, the apparatus can configure a draw state for the plurality of graphics state groups, as described in connection with the examples in FIGS. 3, 4, 5, and 6. In some aspects, the draw state can include state information for each of the plurality of graphics state groups, as described in connection with the examples in FIGS. 3, 4, 5, and 6. At 706, the apparatus can determine a state for each graphics state group of a plurality of graphics state groups, as described in connection with the examples in FIGS. 3, 4, 5, and 6.

At 708, the apparatus can change the state for the at least one graphics state group of the plurality of graphics state groups such that the at least one graphics state group includes a changed state, as described in connection with the examples in FIGS. 3, 4, 5, and 6. At 710, the apparatus can determine whether at least one graphics state group of the plurality of graphics state groups includes a changed state, as described in connection with the examples in FIGS. 3, 4, 5, and 6. At 712, the apparatus can identify the at least one graphics state group of the plurality of graphics state groups including the changed state, as described in connection with the examples in FIGS. 3, 4, 5, and 6.

At 714, the apparatus can determine the state information for the at least one graphics state group of the plurality of graphics state groups, as described in connection with the examples in FIGS. 3, 4, 5, and 6. At 716, the apparatus can communicate the state information for the at least one graphics state group of the plurality of graphics state groups when the at least one graphics state group includes a changed state, as described in connection with the examples in FIGS. 3, 4, 5, and 6. In some aspects, the state information can include information regarding the state of the at least one graphics state group, as described in connection with the examples in FIGS. 3, 4, 5, and 6. At 718, the apparatus can transmit the state information for the at least one graphics state group of the plurality of graphics state groups to a GPU, as described in connection with the examples in FIGS. 3, 4, 5, and 6. In some aspects, the state information for the at least one graphics state group can be transmitted by a CPU, as described in connection with the examples in FIGS. 3, 4, 5, and 6.

At 720, the apparatus can determine whether one or more graphics state groups of the plurality of graphics state groups include an unchanged state, as described in connection with the examples in FIGS. 3, 4, 5, and 6. At 722, the apparatus can copy the state or state pointer for each of the one or more graphics state groups of the plurality of graphics state groups when the one or more graphics state groups include an unchanged state, as described in connection with the examples in FIGS. 3, 4, 5, and 6. In some aspects, the state for each of the one or more graphics state groups including the unchanged state can be copied by a CP of a GPU during a visibility pass, as described in connection with the examples in FIGS. 3, 4, 5, and 6. In some aspects, the one or more graphics state groups of the plurality of graphics state groups including an unchanged state can be determined based on the state information, as described in connection with the examples in FIGS. 3, 4, 5, and 6.

At 724, the apparatus can render at least some content of display content based on the state information for the at least one graphics state group of the plurality of graphics state groups, as described in connection with the examples in FIGS. 3, 4, 5, and 6. In some aspects, the changed state of the at least one graphics state group can be determined based on a previous draw call and a current draw call, as described in connection with the examples in FIGS. 3, 4, 5, and 6. In some instances, the state information can include a list of the state for each graphics state group of the at least one graphics state group, as described in connection with the examples in FIGS. 3, 4, 5, and 6. In some aspects, the determination whether the at least one graphics state group of the plurality of graphics state groups includes a changed state can be performed by a CPU, as described in connection with the examples in FIGS. 3, 4, 5, and 6.

In one configuration, a method or apparatus for graphics processing is provided. The apparatus may be a CPU, a GPU, or some other processor that can perform graphics processing. In one aspect, the apparatus may be the processing unit 120 within the device 104, or may be some other hardware within device 104 or another device. The apparatus may include means for determining a state for each graphics state group of a plurality of graphics state groups. The apparatus may also include means for determining whether at least one graphics state group of the plurality of graphics state groups includes a changed state. The apparatus may also include means for communicating state information for the at least one graphics state group of the plurality of graphics state groups when the at least one graphics state group includes a changed state. The apparatus may also include means for identifying the at least one graphics state group of the plurality of graphics state groups including the changed state. The apparatus may also include means for changing the state for the at least one graphics state group of the plurality of graphics state groups such that the at least one graphics state group includes a changed state. The apparatus may also include means for determining the state information for the at least one graphics state group of the plurality of graphics state groups. The apparatus may also include means for transmitting the state information for the at least one graphics state group of the plurality of graphics state groups to a GPU. The apparatus may also include means for determining whether one or more graphics state groups of the plurality of graphics state groups include an unchanged state. The apparatus may also include means for copying the state for each of the one or more graphics state groups of the plurality of graphics state groups when the one or more graphics state groups include an unchanged state. The apparatus may also include means for configuring a draw state for the plurality of graphics state groups. The apparatus may also include means for rendering at least some content of display content based on the state information for the at least one graphics state group of the plurality of graphics state groups. The apparatus may also include means for determining each of the plurality of graphics state groups based on the display content.

The subject matter described herein can be implemented to realize one or more benefits or advantages. For instance, the described graphics processing techniques can be used by a GPU, a CPU, or some other processor that can perform graphics processing to implement the state information techniques described herein. This can also be accomplished at a low cost compared to other graphics processing techniques. Moreover, the graphics processing techniques herein can improve or speed up data processing or execution. Further, the graphics processing techniques herein can improve resource or data utilization and/or resource efficiency. Additionally, aspects of the present disclosure can utilize a state information process that can reduce both time spent and money consumed during an incremental stream or command stream.

In accordance with this disclosure, the term "or" may be interrupted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of interoperative hardware units, including one or more processors as described above, in conjunction with suitable software and/or firmware.

Various examples have been described. These and other examples are within the scope of the following claims.

What is claimed is:

1. A method of graphics processing at a processing unit, comprising:
    determining a state for each graphics state group of a plurality of graphics state groups;
    determining whether at least one graphics state group of the plurality of graphics state groups includes a changed state; and
    communicating state information for the at least one graphics state group of the plurality of graphics state groups when the at least one graphics state group includes a changed state, wherein the state information includes information regarding the state of the at least one graphics state group.

2. The method of claim 1, further comprising:
    identifying the at least one graphics state group of the plurality of graphics state groups including the changed state.

3. The method of claim 1, further comprising:
    changing the state for the at least one graphics state group of the plurality of graphics state groups such that the at least one graphics state group includes a changed state.

4. The method of claim 1, further comprising:
    determining the state information for the at least one graphics state group of the plurality of graphics state groups.

5. The method of claim 1, wherein communicating the state information for the at least one graphics state group of the plurality of graphics state groups further comprises:
    transmitting the state information for the at least one graphics state group of the plurality of graphics state groups to a graphics processing unit (GPU).

6. The method of claim 5, wherein the state information for the at least one graphics state group is transmitted by a central processing unit (CPU).

7. The method of claim 1, further comprising:
    determining whether one or more graphics state groups of the plurality of graphics state groups include an unchanged state.

8. The method of claim 7, wherein the state for each of the one or more graphics state groups of the plurality of graphics state groups is copied when the one or more graphics state groups include an unchanged state.

9. The method of claim 8, wherein the state for each of the one or more graphics state groups including the unchanged state is copied by a command processor (CP) of a graphics processing unit (GPU) during a visibility pass.

10. The method of claim 7, wherein the one or more graphics state groups of the plurality of graphics state groups including an unchanged state are determined based on the state information.

11. The method of claim 1, further comprising:
configuring a draw state for the plurality of graphics state groups, wherein the draw state includes state information for each of the plurality of graphics state groups.

12. The method of claim 1, wherein at least some content of display content is rendered based on the state information for the at least one graphics state group of the plurality of graphics state groups.

13. The method of claim 12, further comprising:
determining each of the plurality of graphics state groups based on the display content.

14. The method of claim 1, wherein the changed state of the at least one graphics state group is determined based on a previous draw call and a current draw call.

15. The method of claim 1, wherein the state information includes a list of the state for each graphics state group of the at least one graphics state group.

16. The method of claim 1, wherein the determination whether the at least one graphics state group of the plurality of graphics state groups includes a changed state is performed by a central processing unit (CPU).

17. An apparatus for graphics processing, comprising:
a memory; and
at least one processor coupled to the memory and configured to:
determine a state for each graphics state group of a plurality of graphics state groups;
determine whether at least one graphics state group of the plurality of graphics state groups includes a changed state; and
communicate state information for the at least one graphics state group of the plurality of graphics state groups when the at least one graphics state group includes a changed state, wherein the state information includes information regarding the state of the at least one graphics state group.

18. The apparatus of claim 17, wherein the at least one processor is further configured to:
identify the at least one graphics state group of the plurality of graphics state groups including the changed state.

19. The apparatus of claim 17, wherein the at least one processor is further configured to:
change the state for the at least one graphics state group of the plurality of graphics state groups such that the at least one graphics state group includes a changed state.

20. The apparatus of claim 17, wherein the at least one processor is further configured to:
determine the state information for the at least one graphics state group of the plurality of graphics state groups.

21. The apparatus of claim 17, wherein to communicate the state information for the at least one graphics state group of the plurality of graphics state groups further comprises the at least one processor configured to:
transmit the state information for the at least one graphics state group of the plurality of graphics state groups to a graphics processing unit (GPU).

22. The apparatus of claim 21, wherein the state information for the at least one graphics state group is transmitted by a central processing unit (CPU).

23. The apparatus of claim 17, wherein the at least one processor is further configured to:
determine whether one or more graphics state groups of the plurality of graphics state groups include an unchanged state.

24. The apparatus of claim 23, wherein the state for each of the one or more graphics state groups of the plurality of graphics state groups is copied when the one or more graphics state groups include an unchanged state.

25. The apparatus of claim 24, wherein the state for each of the one or more graphics state groups including the unchanged state is copied by a command processor (CP) of a graphics processing unit (GPU) during a visibility pass.

26. The apparatus of claim 23, wherein the one or more graphics state groups of the plurality of graphics state groups including an unchanged state are determined based on the state information.

27. The apparatus of claim 17, wherein the at least one processor is further configured to:
configure a draw state for the plurality of graphics state groups, wherein the draw state includes state information for each of the plurality of graphics state groups.

28. The apparatus of claim 17, wherein at least some content of display content is rendered based on the state information for the at least one graphics state group of the plurality of graphics state groups.

29. The apparatus of claim 28, wherein the at least one processor is further configured to:
determine each of the plurality of graphics state groups based on the display content.

30. The apparatus of claim 17, wherein the changed state of the at least one graphics state group is determined based on a previous draw call and a current draw call.

31. The apparatus of claim 17, wherein the state information includes a list of the state for each graphics state group of the at least one graphics state group.

32. The apparatus of claim 17, wherein the determination whether the at least one graphics state group of the plurality of graphics state groups includes a changed state is performed by a central processing unit (CPU).

33. An apparatus for graphics processing, comprising:
means for determining a state for each graphics state group of a plurality of graphics state groups;
means for determining whether at least one graphics state group of the plurality of graphics state groups includes a changed state; and
means for communicating state information for the at least one graphics state group of the plurality of graphics state groups when the at least one graphics state group includes a changed state, wherein the state information includes information regarding the state of the at least one graphics state group.

34. The apparatus of claim 33, further comprising:
means for identifying the at least one graphics state group of the plurality of graphics state groups including the changed state.

35. The apparatus of claim 33, further comprising:
means for changing the state for the at least one graphics state group of the plurality of graphics state groups such that the at least one graphics state group includes a changed state.

36. The apparatus of claim 33, further comprising:
means for determining the state information for the at least one graphics state group of the plurality of graphics state groups.

37. The apparatus of claim 33, wherein the means for communicating the state information for the at least one graphics state group of the plurality of graphics state groups is configured to:
transmit the state information for the at least one graphics state group of the plurality of graphics state groups to a graphics processing unit (GPU).

38. The apparatus of claim 37, wherein the state information for the at least one graphics state group is transmitted by a central processing unit (CPU).

39. The apparatus of claim 33, further comprising:
means for determining whether one or more graphics state groups of the plurality of graphics state groups include an unchanged state.

40. The apparatus of claim 39, wherein the state for each of the one or more graphics state groups of the plurality of graphics state groups is copied when the one or more graphics state groups include an unchanged state.

41. The apparatus of claim 40, wherein the state for each of the one or more graphics state groups including the unchanged state is copied by a command processor (CP) of a graphics processing unit (GPU) during a visibility pass.

42. The apparatus of claim 39, wherein the one or more graphics state groups of the plurality of graphics state groups including an unchanged state are determined based on the state information.

43. The apparatus of claim 33, further comprising:
means for configuring a draw state for the plurality of graphics state groups, wherein the draw state includes state information for each of the plurality of graphics state groups.

44. The apparatus of claim 33, wherein at least some content of display content is rendered based on the state information for the at least one graphics state group of the plurality of graphics state groups.

45. The apparatus of claim 44, further comprising:
means for determining each of the plurality of graphics state groups based on the display content.

46. The apparatus of claim 33, wherein the changed state of the at least one graphics state group is determined based on a previous draw call and a current draw call.

47. The apparatus of claim 33, wherein the state information includes a list of the state for each graphics state group of the at least one graphics state group.

48. The apparatus of claim 33, wherein the determination whether the at least one graphics state group of the plurality of graphics state groups includes a changed state is performed by a central processing unit (CPU).

49. A non-transitory computer-readable medium storing computer executable code for graphics processing, comprising code to:
determine a state for each graphics state group of a plurality of graphics state groups;
determine whether at least one graphics state group of the plurality of graphics state groups includes a changed state; and
communicate state information for the at least one graphics state group of the plurality of graphics state groups when the at least one graphics state group includes a changed state, wherein the state information includes information regarding the state of the at least one graphics state group.

* * * * *